US008185489B2

(12) United States Patent
Aaron et al.

(10) Patent No.: US 8,185,489 B2
(45) Date of Patent: May 22, 2012

(54) DEVICES, METHODS, AND COMPUTER-READABLE MEDIA FOR PROVIDING CALENDAR-BASED COMMUNICATION SYSTEM SERVICES

(75) Inventors: Jeffrey Aaron, Atlanta, GA (US); Robert Streijl, Cumming, GA (US)

(73) Assignee: AT&T Intellectual Property, I, L.P., Reno, NV (US)

( * ) Notice: Subject to any disclaimer, the term of this patent is extended or adjusted under 35 U.S.C. 154(b) by 763 days.

(21) Appl. No.: 12/253,137

(22) Filed: Oct. 16, 2008

(65) Prior Publication Data

US 2010/0100519 A1 Apr. 22, 2010

(51) Int. Cl.
*G06F 17/00* (2006.01)
*G06N 5/02* (2006.01)
(52) U.S. Cl. .......................................................... 706/47
(58) Field of Classification Search ...................... 706/47
See application file for complete search history.

(56) References Cited

U.S. PATENT DOCUMENTS

| | | | |
|---|---|---|---|
| 6,553,232 B1 * | 4/2003 | Shaffer et al. ................. 455/440 |
| 6,826,150 B1 | 11/2004 | Bhattacharya et al. | |
| 6,947,750 B2 | 9/2005 | Kakani et al. | |
| 7,630,986 B1 * | 12/2009 | Herz et al. ............................ 1/1 |
| 7,796,190 B2 | 9/2010 | Basso et al. | |
| 7,969,990 B2 | 6/2011 | Shmueli et al. | |
| 2003/0154242 A1 | 8/2003 | Hayes et al. | |
| 2004/0042489 A1 | 3/2004 | Messick et al. | |
| 2005/0157660 A1 | 7/2005 | Mandato et al. | |
| 2006/0025149 A1 | 2/2006 | Karaoguz et al. | |
| 2006/0092037 A1 | 5/2006 | Neogi et al. | |
| 2007/0050492 A1 | 3/2007 | Jorgensen | |
| 2007/0133428 A1 | 6/2007 | Taylor et al. | |
| 2007/0198682 A1 | 8/2007 | Pazhyannur et al. | |
| 2007/0202923 A1 | 8/2007 | Jung et al. | |
| 2008/0008188 A1 | 1/2008 | Buga et al. | |
| 2009/0005071 A1 | 1/2009 | Forstall et al. | |
| 2009/0328087 A1 | 12/2009 | Higgins et al. | |
| 2010/0099388 A1 | 4/2010 | Aaron et al. | |
| 2010/0099392 A1 | 4/2010 | Aaron et al. | |
| 2010/0100613 A1 | 4/2010 | Aaron et al. | |
| 2010/0100822 A1 | 4/2010 | Aaron et al. | |

* cited by examiner

*Primary Examiner* — Michael B Holmes
(74) *Attorney, Agent, or Firm* — Woodcock Washburn LLP

(57) ABSTRACT

Devices, methods and computer-readable media for providing calendar-based communication system services. Data for providing calendar-based communication system services is stored. The data is classified. Policy rules are applied to identify candidate actions. the identified candidate actions are checked for feasibility. The identified candidate actions verified as being feasible are implemented. The candidate actions may include suggestions for the user, marketing material tailored to the user, and network actions selected for the user.

20 Claims, 4 Drawing Sheets

DEVICES, METHODS, AND COMPUTER-READABLE MEDIA FOR PROVIDING CALENDAR-BASED COMMUNICATION SYSTEM SERVICES

CROSS-REFERENCE TO RELATED APPLICATIONS

This application is related to the following co-pending and commonly-assigned patent applications, which are hereby incorporated herein by reference in its respective entirety:

"DEVICES, METHODS, AND COMPUTER-READABLE MEDIA FOR PROVIDING CONTROL OF SWITCHING BETWEEN MEDIA PRESENTATION SCREENS" having Ser. No. 12/253,003;

"DEVICES, METHODS, AND COMPUTER-READABLE MEDIA FOR PROVIDING SERVICES BASED UPON IDENTIFICATION OF DECISION MAKERS AND OWNERS ASSOCIATED WITH COMMUNICATION SERVICES" having Ser. No. 12/253,157;

"DEVICES, METHODS, AND COMPUTER-READABLE MEDIA FOR PROVIDING BROAD QUALITY OF SERVICE OPTIMIZATION USING POLICY-BASED SELECTIVE QUALITY DEGRADATION" having Ser. No. 12/253,178; and "DEVICES, METHODS, AND COMPUTER-READABLE MEDIA FOR PROVIDING QUALITY OF SERVICE OPTIMIZATION VIA POLICY-BASED REARRANGEMENTS" having Ser. No. 12/253,197.

BACKGROUND

Embodiments relate to systems, methods, and computer-readable media for providing customer-centric communications services. More particularly, embodiments relate to devices, methods and computer-readable media for providing calendar-based communication system services.

Wireless cell phone technology offers the convenience of keeping in contact with others at any place and at any time. Cell phones may connect wirelessly with a cell phone network to offer data and communication services. Cell phones often combine communication, digital photography, video game functions, video and audio-video viewing functions, etc. To take advantage of this added functionality, hybrid cell phones that combine short-range (WiFi), high-speed Internet access and cellular service have been marketed to allow users to make connections using a local wireless Internet access point and seamlessly switch over to a cell phone network whenever necessary. Moreover, cellular carriers have spent billions of dollars to upgrade their systems for high-speed data. The upgraded networks offer wide coverage that exceeds Wi-Fi's short range.

The computing power and the functionality now present on mobile devices enables many new services and functions to be provided to communication system customers. In addition, such new services and functions present opportunities for new revenue streams for system carriers. By providing the new services and functions, the carriers are able to develop long-term relationships with both residential and corporate subscribers.

Control of applications, services and networks associated with a communication system can be achieved using a policy architecture. A policy architecture may include a rules engine plus enforcement points in applications and throughout the network. However, the development of the policy rules generally requires inputs from the customer. As the possibilities expand, the required user inputs will become much more complicated, broader in scope, and considerably more confusing. Accordingly, new services and functions may lead to customer dissatisfaction rather than providing the improved customer relationship and corresponding increase in revenue.

It is respect to these and other considerations that the embodiments disclosed herein have been made.

SUMMARY OF THE INVENTION

According to exemplary embodiments, methods, computer-readable media, and devices provide calendar-based communication system services.

According to one embodiment, data for providing calendar-based communication system services is stored, the data is classified, policy rules are applied to identify candidate actions; identified candidate actions are verified as being feasible and the identified candidate actions are implemented when the identified candidate actions are verified as being feasible. The candidate actions may include suggestions for the user, marketing material tailored to the user, and network actions selected for the user.

These and other features and advantages, which characterize embodiments, will be apparent from a reading of the following detailed description and a review of the associated drawings. It is to be understood that both foregoing general description and the following detailed description are exemplary and explanatory only and are not restrictive of the invention, as claimed.

DETAILED DESCRIPTION

In the following description of the embodiments, reference is made to the accompanying drawings that form a part hereof, and in which is shown by way of illustration the specific embodiments in which the invention may be practiced. It is to be understood that other embodiments may be equally applicable to providing enhanced user experience in a communications system.

Figure 1:
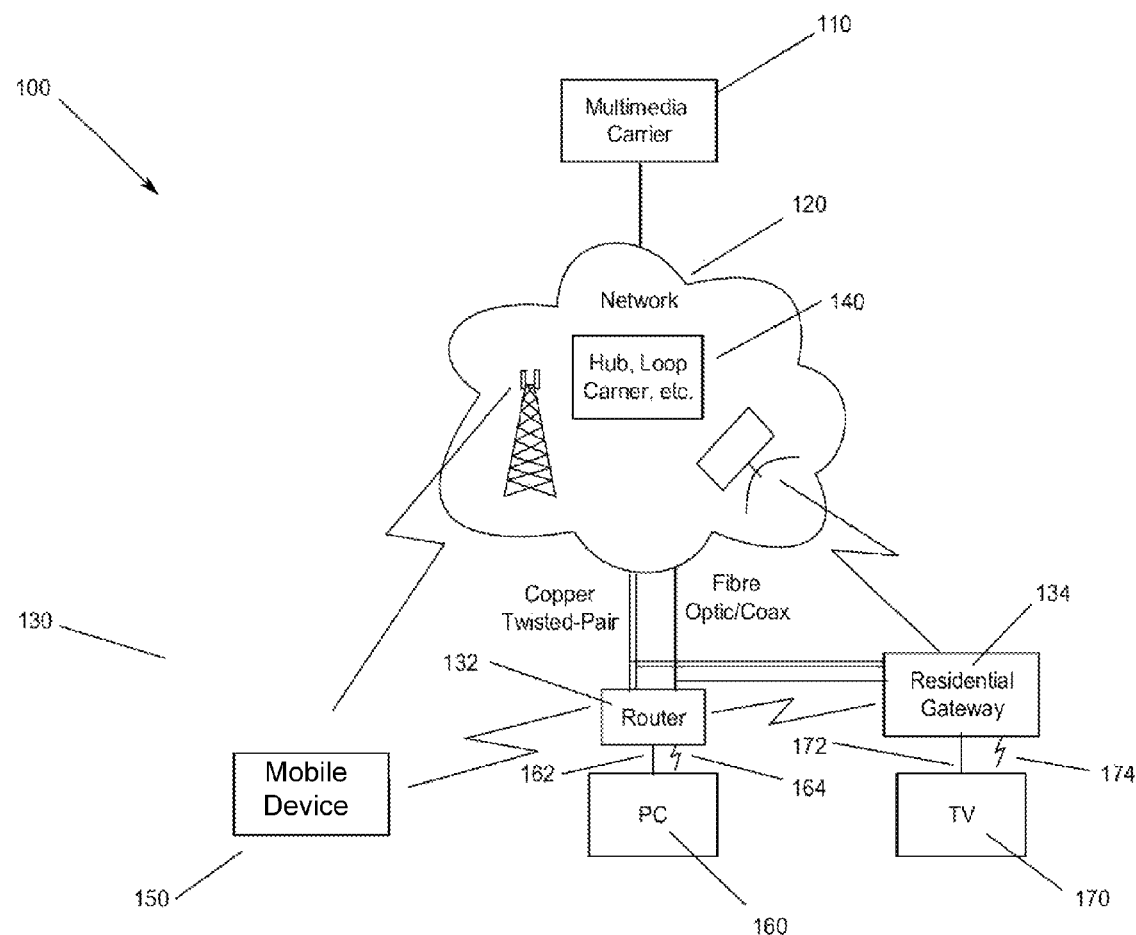
FIG. 1 illustrates a general block diagram of a media and communication network according to an exemplary embodiment.

FIG. 1 illustrates a general block diagram 100 of a media and communication network according to an exemplary embodiment. A multimedia carrier 110 is configured to provide hardware and software infrastructure for the delivery of content and for providing communication channels for subscribers or other users. Examples of communication channels includes telephone services, Internet access, voice-over-IP, interactive television and gaming, etc. The multimedia carrier 110 acquires programming from content providers and encodes the content. The multimedia carrier 110 may also add local programming and provide additional digital services such as video on demand, and storage for content according to user directions.

The multimedia carrier 110 is coupled to a network 120 for distributing the content, providing Internet access, telephone services, etc. The network 120 provides the intermediate infrastructure between the point-of-delivery 130 and the multimedia carrier 110. The network 120 may be configured to provide one or more or the intermediate infrastructure 140 for television content delivery, plain-old-telephone system, satellite television, Internet services, wireless communications, such as cellular mobile phone services, etc. Accordingly, the network may include hub offices, IP service offices, local loop carrier facilities, satellite carrier facilities, communication satellites, telecom point-of-presence, mobile switching centers, base stations, and distribution nodes.

At the point-of-delivery 130, a router 132 may be used to provide digital services, such as Internet access. A computer or other Internet-capable device 160 may be coupled to the router 132 by a network cable 162 or wirelessly 164. A residential gateway 134 may be used to provide content, e.g., IPTV, to multimedia-capable viewing devices, such as a television, via a cable 172 or wirelessly 174. A mobile device 150 operates within a mobile operating system. Examples of such mobile devices 150 may include cell phones, smart phones, handheld computers, personal digital assistants, etc.

In addition, mobile devices 150 may be configured to use location-based services (LBS) to receive information specific to a location. Some examples of location-based services include requesting the nearest business or service, such as an ATM or restaurant, and finding a friend. A service provider may obtain the location of a mobile device from a global positioning system (GPS) circuit built into the device, or by using radiolocation and trilateration based on the signal-strength of the closest cell-phone towers (for phones without GPS features). Any other suitable means of obtaining or estimating location may also be used.

Figure 2:
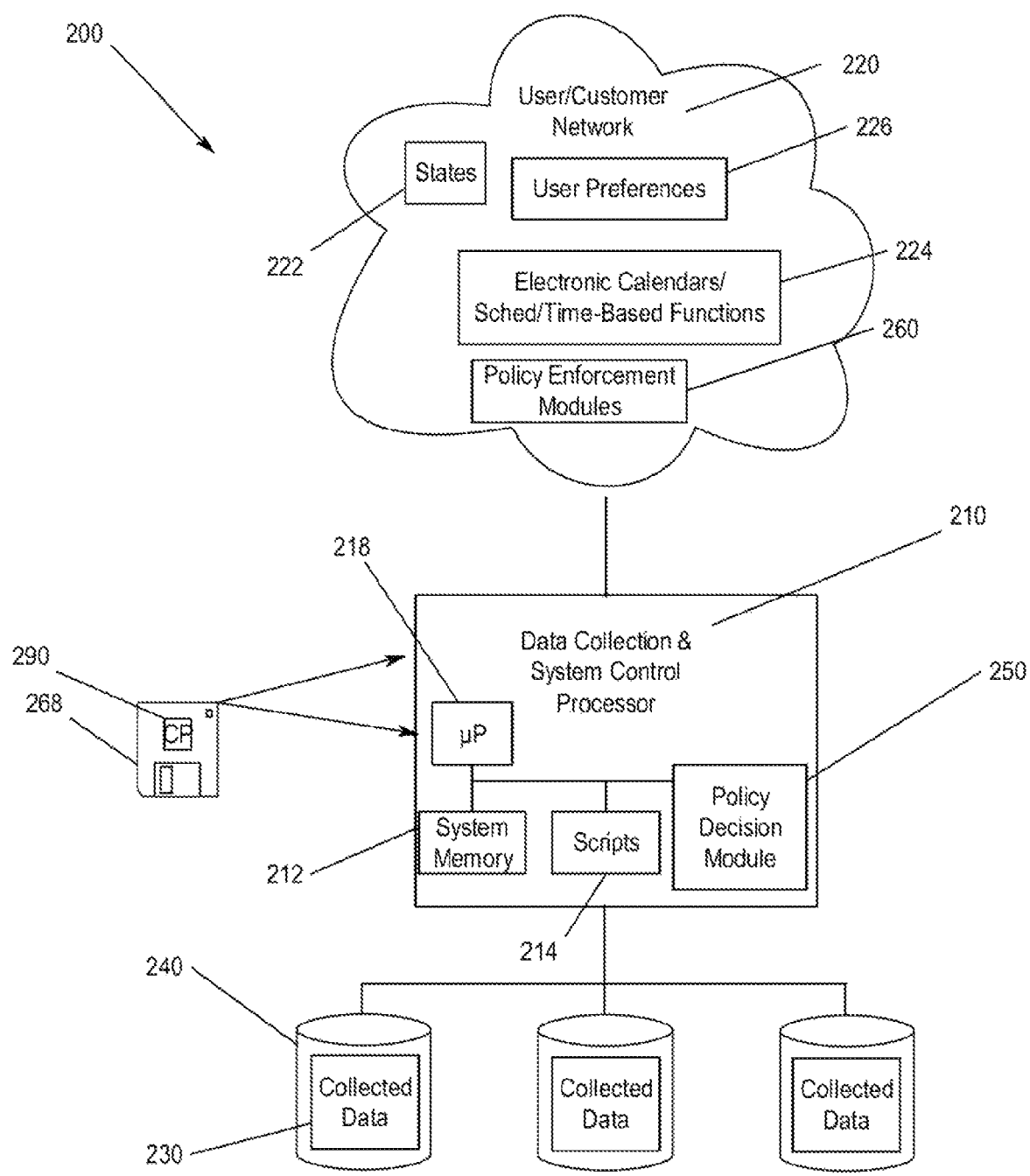
FIG. 2 illustrates a system for providing calendar-based communication system services according to an exemplary embodiment.

FIG. 2 illustrates a system 200 for providing calendar-based communication system services according to an exemplary embodiment. A data collection and system control processor 210 collects and controls the system based upon collected data 230. The data collection and system control processor 210 includes memory 212, scripts 214, a policy decision module 250 and a processor 218. The processor 218 controls the functions, analysis and manipulation of collected data, runs scripts 214 and based on policies, identifies suggestions or network changes to perform. The data collection and system control processor 210 accesses or is provided data from a customer's electronic calendars and related schedule-based/time-based functions 224, i.e., any scheduling type of application.

Calendaring is an important application that allows users to organize activities. The data collection and system control processor 210 also obtains the user preferences 226 and builds profiles on users based on the activities of the users. The collected data 230 is stored in a database 240 or other suitable means of storage, e.g., flash memory. The calendar data 230 may be indicate whether a user is busy or available, and via inference, history and rules, may indicated the "degree of" busy or availability. The data collection and system control processor 210 may also identify the types of activities and types of meetings the user plans on attending. The data collection and system control processor 210 also identifies who the user interacts with, such as friends, co-workers, business associates, acquaintances, etc. Still further, the calendar data indicates the user's preferences, likes, and dislikes. The data 230 in the database 240 may be analyzed for further determination of the type of calendar-based communication system services to provide the user. The network control and suggestion making may even be used to control the switching of screens based on the schedule information. Another example includes adjusting the volume control of the cell phone of a user when the user is driving. Also, calls may be rerouted based on the analysis of the user's calendar and external data.

In one embodiment, the data collection and system control processor 210 uses the collected data 230 to provide calendar-based communication system services to the network of users 220. The data collection and system control processor 210 classifies the inputs/calendar events, applying rules to determine candidate actions, checking for action feasibility, and applying further rules either to implement the actions and/or send helpful suggestions to the user/customer. Thus, the data collection and system control processor 210 provides marketing and making suggestions to a user rather than simply adjusting parameters in the network. The database 240 may also be used to store relevant information regarding users, user preferences, allowable actions, rule parameters such as decision thresholds, and large numbers of various indexed suggestions. Accordingly, the data collection and system control processor 210 may be configured to manage a customer's services, applications and network functions. However, the applications, services and functions associated with the communication network that correlate to calendar data of the user must be identified. The data collection and system control processor 210 along with the decision making module 250 provide the decision making capability of the system 200. Thus, the data collection and system control processor 210 may be configured to analyze a customer's calendar 224 and make suggestions or implement actions based on policy rules and the collected data.

As shown in FIG. 2, the data collection and system control processor 210 includes a policy decision module 250 that makes decisions based on the collected data 230. Based upon the collected data 230, the data collection and system control processor 210 may identify different system states 222, such as the state of the network, various states of network-related equipment such as routers and firewalls, various states of service-related equipment such servers, the state of a service provided to a user, even the state of a customer, or other more fine-grained managed object states. The data collection and system control processor 210 may also identify functions, services, event suggestions, etc. that may be of interest to a customer and which fits the customer's calendar 224. Inferences regarding what users like, need, and would be inclined to prefer can also be obtained from calendar and schedule-related information When the data collection and system control processor 210 determines a customer may be interested in a particular service or function, the policy decision module 250 may communicate with policy enforcement functions 260 to activate or implement the identified services or functions.

The data collection and system control processor 210 verifies feasibility by checking states 222 for available bandwidth/resources, and for a future use may further include pre-scheduling at least a portion of these. Scripts 214 for receiving and acting on user responses to suggestion may be used to set-up and trigger further actions and/or to loop back to an earlier step. Actions may include activating and/or modifying applications/services (supplied with specific customizing inputs/parameters for a specific user), activating and/or modifying supporting network connections/resources, making specific suggestions, consulting other policy decision modules (e.g., in other service providers), performing specific billing, storing or changing associated parameters, etc.

Thus, the data collection and system control processor 210 implements rule-based control of applications, services, and communications networks in conjunction with a user's calendar, thereby selecting relevant & desirable actions and appropriately implementing those actions as feasible based on calendar-related information. The data collection and system control processor 210 may also take into consideration application/service/network states and network resources, including inference and suggestions to aid the user and simplify/reduce any required user inputs or responses.

Providing control of applications/services, and supporting the communications network has many increasing benefits for users, especially as related capabilities, scope/breadth of use, and complexity increases over time. Accordingly, making this control at least partly dependent on calendar and schedule-related information has enormous potential benefit. The policy rules used by the policy decision module 250 can help determine what to do in this regard, including what would be acceptable to automatically accomplishing currently as well as what might be worthwhile to suggest to the customer. Exception handling may be provided by detecting errors and reverting to a last known working state.

FIG. 2 shows only one embodiment. However, other embodiments may take the form of an entirely software embodiment or an embodiment containing both hardware and software elements. Embodiments of the invention may be implemented in software that includes, but is not limited to, firmware, resident software, microcode, etc. Furthermore, other embodiments may take the form of a computer program product 290 accessible from a computer-usable or computer-readable medium 268 providing program code for use by or in connection with a computer or any instruction execution system.

For the purposes of this description, a computer-usable or computer readable medium 268 can be any apparatus that can contain, store, communicate, propagate, or transport the program for use by or in connection with the instruction execution system, apparatus, or device. The medium 268 may be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A system suitable for storing and/or executing program code for providing data collection and system control according to an exemplary embodiment may include at least one processor 210 coupled directly or indirectly to memory elements 212. The memory elements 212 can include local memory employed during actual execution of the program code, bulk storage, and cache memories which provide temporary storage of at least some program code in order to reduce the number of times code must be retrieved from bulk storage during execution.

Accordingly, the computer program 290 comprise instructions which, when read and executed by the system 200 of FIG. 2, causes the system 200 to perform the steps necessary to execute the steps or elements of embodiments.

Moreover, the functionality associated with the processor for providing data collection and system control 210 may be centralized or partially to fully distributed and included in any piece of equipment or any portion of software in the system 200. Accordingly, the data collection and control framework may be distributed across the system 200. Further, the data collection and control framework may be configured as an overlay over the system infrastructure to offer the services, functions and suggestions discussed above. Still further, the control process may be automated, semi-automated, or manual.

Figure 3:
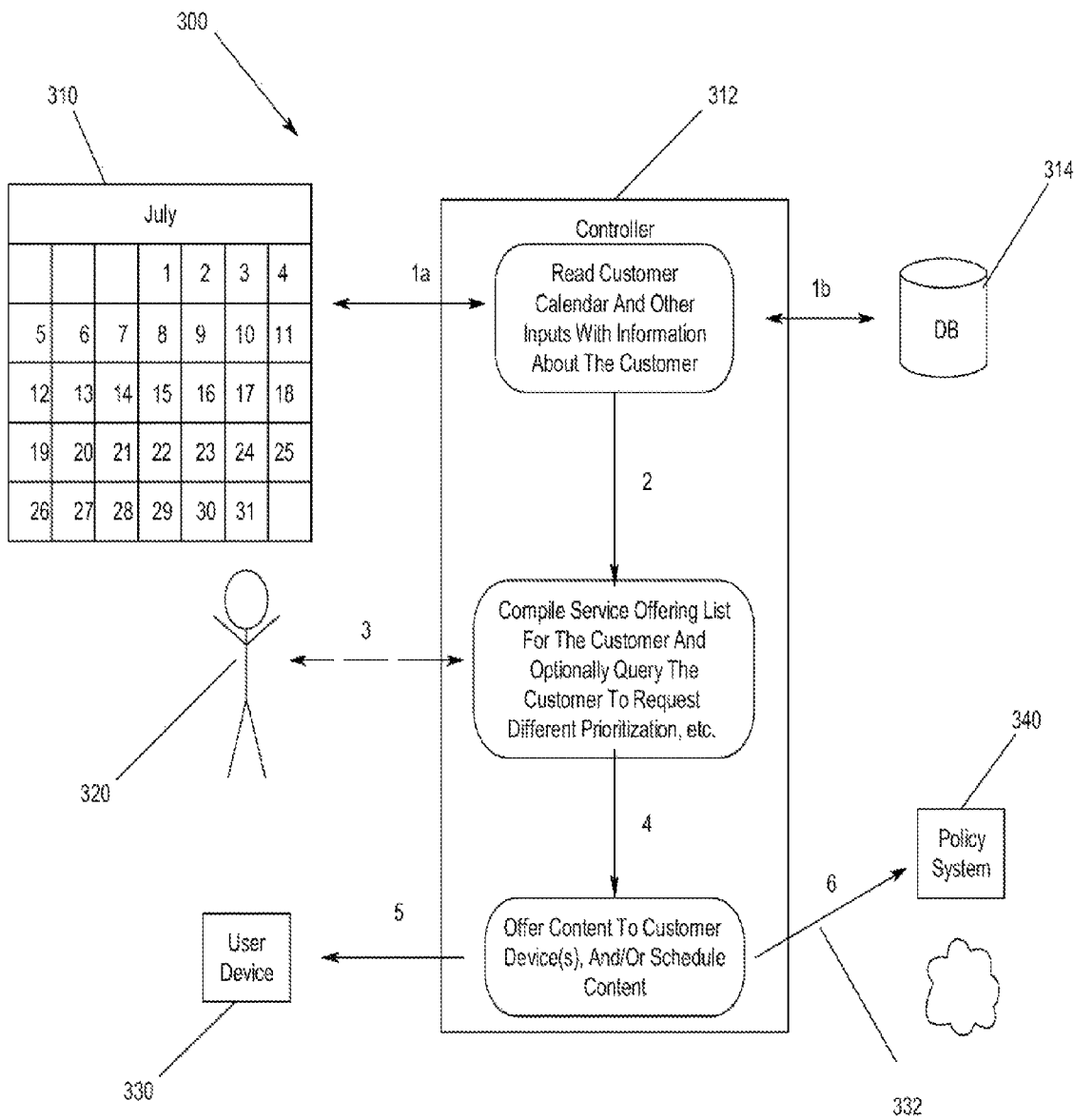
FIG. 3 illustrates an example of a calendar-based service, network control and suggestion generation system according to an exemplary embodiment.

FIG. 3 illustrates an example of a calendar-based service, network control and suggestion generation system 300 according to an exemplary embodiment. In FIG. 3, data from a calendar 310 is provided to a controller 312. Data from a database 314 is also provided to controller 312. The controller 312 compiles a service offering list for the customer. Optionally, the controller 312 queries the customer 320 to request different prioritization, etc. The controller 312 provides content and/or suggestions to a device of the customer 330 and/or schedules content or activity 332. The suggestions for presenting to the user may include marketing tailored for the user. Policy system 340 initiates the delivery of content or an action based upon policy rules and the schedule provided by the controller 312.

Figure 4:
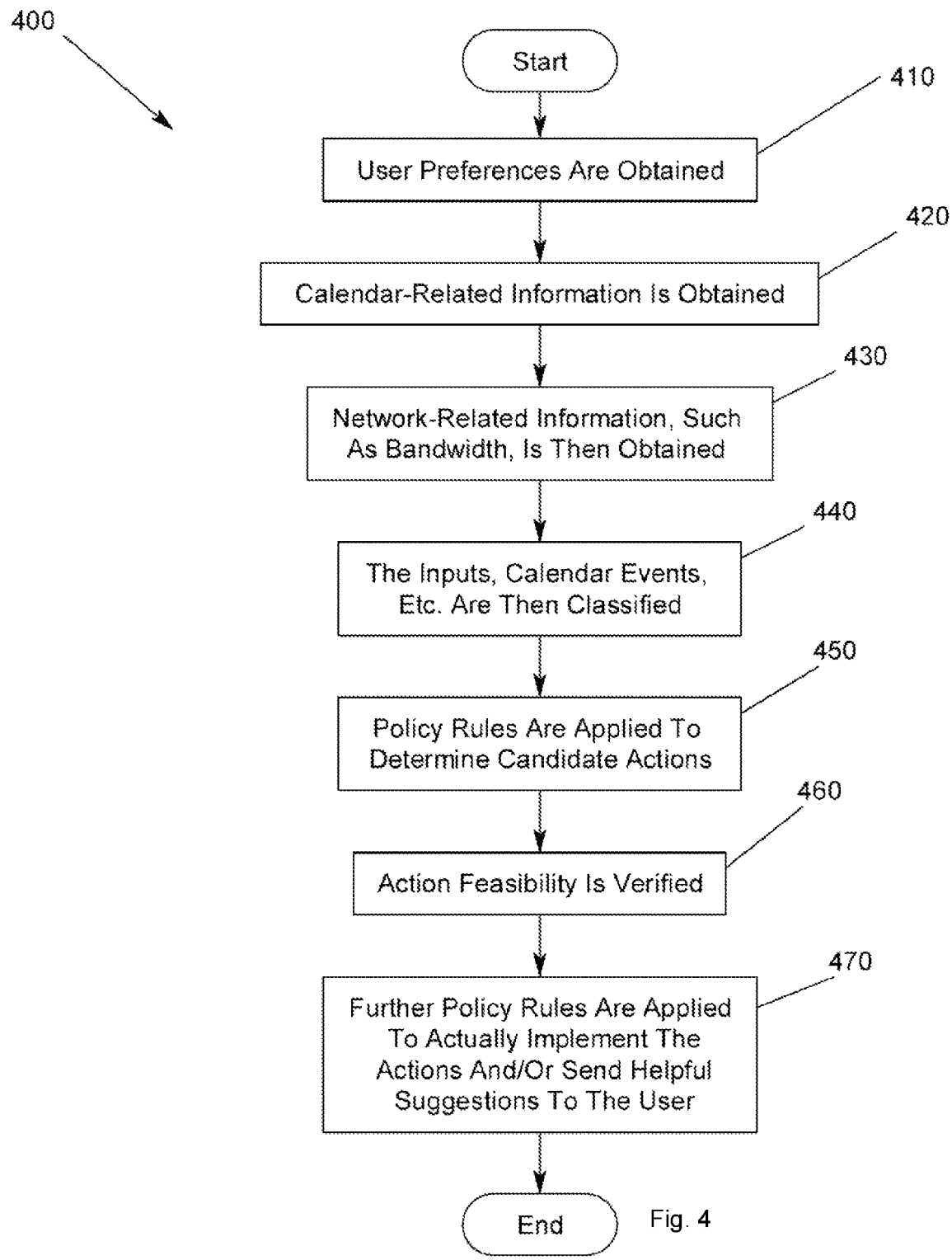
FIG. 4 is a flow chart of a method for providing calendar-based communication system services according to an exemplary embodiment.

FIG. 4 is a flow chart 400 of a method for processor controlled provisioning of calendar-based communication system services. In FIG. 4, user preferences are obtained 410. The user preferences may be obtained at service sign-up, via web page or other interactive capability, or from profile/demographics data. An associated database may be used to store relevant info regarding users, preferences, allowable actions, rule parameters such as decision thresholds, and large numbers of various indexed suggestions. Then, calendar-related information is obtained 420. Inputs from calendaring application/system are received. One or more electronic calendars may also be inspected. Network-related information, such as bandwidth, is then obtained 430. The inputs, calendar events, etc. are then classified 440. Policy rules are applied to determine candidate actions 450. The policy rules may be based at least partly on user preferences. Actions may include, but are not limited to: activating and/or modifying applications/services supplied with specific user customizing inputs/parameters; activating and/or modifying supporting network connections/resources; and making specific suggestions to the user; making selections, including picking "offers" to provide to the user; consulting other policy entities, e.g., in other service providers, performing specific billing, storing or changing associated parameters, etc.

Next, action feasibility is verified 460. This may include asking the user or inferring what mode does the user have access to at a given time, checking for available bandwidth/resources, and pre-scheduling at least a portion of bandwidth/resources, i.e., for a future use. Further policy rules are applied to actually implement the actions and/or send helpful suggestions to the user 470. Scripts for receiving and acting on user responses to suggestion may be used to set-up and trigger further actions and/or to loop back to an earlier step.

Accordingly, devices, methods and computer-readable media for providing calendar-based communication system services are provided by tying electronic calendars and related schedule-based/time-based functions to policy. Such calendar-based communication system services may include activating and/or modifying applications/services, activating and/or modifying supporting network connections/resources, making specific suggestions, consulting other policy entities, performing specific billing, and storing or changing associated parameters, etc. Other actions, content and suggestions may be implemented in an embodiment.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A device for providing enhanced user experience in a communications system, comprising:
   memory for storing data for providing calendar-based communication system services; and
   a controller for classifying the data, for applying policy rules to identify candidate actions, for verifying that identified candidate actions are feasible and for implementing identified candidate actions when identified candidate actions are verified as being feasible.

2. The device of claim 1, wherein the data includes user preferences.

3. The device of claim 1, wherein the data includes information derived from a calendar of the user.

4. The device of claim 1, wherein the data includes network-related information.

5. The device of claim 1, wherein the candidate actions include applications, services and functions associated with the communication network.

6. The device of claim 1, further comprising a database for storing information regarding user preferences, allowable actions and rule parameters.

7. The device of claim 1, wherein the rule parameters include decision thresholds and an indexed list of suggestions associated with the communications system.

8. The device of claim 1, wherein the processor verifies that identified candidate actions are feasible by generating user queries and by checking network parameters.

9. The device of claim 1, wherein the identified candidate actions include suggestions for presentation to the user.

10. The device of claim 9, wherein the suggestions for presenting to the user include marketing tailored for the user.

11. The device of claim 1, wherein the identified candidate actions include at least one selected from a group comprising activating applications, activating services, modifying applications, modifying services, activating supporting network connections, activating supporting network resources, modifying supporting network connections, modifying supporting network resources.

12. A computer-readable medium having computer-executable instructions that, when executed, cause a computer system to perform operations for providing enhanced user experience in a communications system, the operations including:
   storing data for providing calendar-based communication system services;
   classifying the data;
   applying policy rules to identify candidate actions;
   verifying that identified candidate actions are feasible; and
   implementing the identified candidate actions when identified candidate actions are verified as being feasible.

13. The computer-readable medium of claim 12, wherein the storing data includes storing user preferences.

14. The computer-readable medium of claim 12, wherein the storing data includes information derived from a calendar of the user.

15. The computer-readable medium of claim 12, wherein the storing data includes storing network-related information.

16. The computer-readable medium of claim 12, wherein the applying policy rules to identify candidate action comprises identifying applications, services and functions associated with the communication network that correlate to calendar data of the user.

17. The computer-readable medium of claim 12, wherein the storing data for providing calendar-based communication system services further comprising storing information regarding user preferences, allowable actions, rule parameters and an indexed list of suggestions for presentation to the user.

18. The computer-readable medium of claim 12, wherein the applying policy rules to identify candidate actions comprises applying decision thresholds and an indexed list of suggestions associated with the communications system and the identified candidate actions include suggestions for presentation to the user.

19. The computer-readable medium of claim 12, wherein the applying policy rules to identify candidate actions comprises identifying marketing tailored for the user.

20. A method for providing enhanced user experience in a communications system, comprises:
   storing data for providing calendar-based communication system services; classifying the data;
   applying policy rules to identify candidate actions;
   verifying that identified candidate actions are feasible; and
   implementing the identified candidate actions when identified candidate actions are verified as being feasible.

* * * * *